Nov. 17, 1959 J. ISREELI Re. 24,736

DIALYZERS

Original Filed April 25, 1957 3 Sheets-Sheet 1

INVENTOR.
Jack Isreeli
BY Edwin Levicoh
Harry Cole
ATTORNEYS

INVENTOR.
Jack Isreeli
BY Edwin Levisohn
Harry Cohn
ATTORNEYS

INVENTOR.
Jack Isreeli
BY Edwin Jenicek
Harry Cole
ATTORNEYS

United States Patent Office

Re. 24,736
Reissued Nov. 17, 1959

24,736

DIALYZERS

Jack Isreeli, Tuckahoe, N.Y., assignor, by mesne assignments, to Technicon Instruments Corporation, Chauncey, N.Y., a corporation of New York Original No. 2,864,507, dated December 16, 1958, Serial No. 655,093, April 25, 1957. Application for reissue December 22, 1958, Serial No. 782,341

14 Claims. (Cl. 210—321)

Matter enclosed in heavy brackets [ ] appears in the original patent but forms no part of this reissue specification; matter printed in italics indicates the additions made by reissue.

The present invention relates to dialyzers.

An object of the present invention is the provision of a dialyzer of generally simplified construction which nevertheless is highly efficient in operation, the use of which is set forth in great detail in the patent to Skeggs, No. 2,787,149, and assigned to the assignee of this application.

Another object is to provide a dialyzer having readily accessible fluid inlets and fluid outlets at each side of the dialyzer membrane. In this connection, it is a more specific object of the invention to provide said outlets in juxtaposition at outer edge portions of the dialyzer members between which the membrane is mounted.

A further object is the provision of a dialyzer apparatus in which the number of convolutions in each of the dialyzer members between which the membrane is mounted can be greatly increased in number with a very little increase in the diameter of said members over prior art dialyzers.

A further object is to provide a highly novel clamping arrangement for clamping together in fluid-tight relation the dialyzer members between which the dialyzer membrane is disposed, the arrangement being such that the members are retained against relative tilting so as to prevent the separation of the fluid passages provided in the confronting faces of said members.

Another object of the invention is to provide a dialyzer construction and arrangement of dialyzer elements to enable the operative capacity of the dialyzer to be increased without increasing the diameter of the apparatus.

Another object is to provide improved means for releasably clamping the dialyzer parts in operative relation.

A still further object is the provision of a highly novel arrangement for effecting registry of the fluid passages defined in the opposing faces of the dialyzer members.

The above and other objects, features and advantages of the present invention will be more fully understood from the following description considered in connection with the accompanying illustrative drawings.

In the drawings which illustrative the best mode presently contemplated of carrying out the invention:

Figure 1:
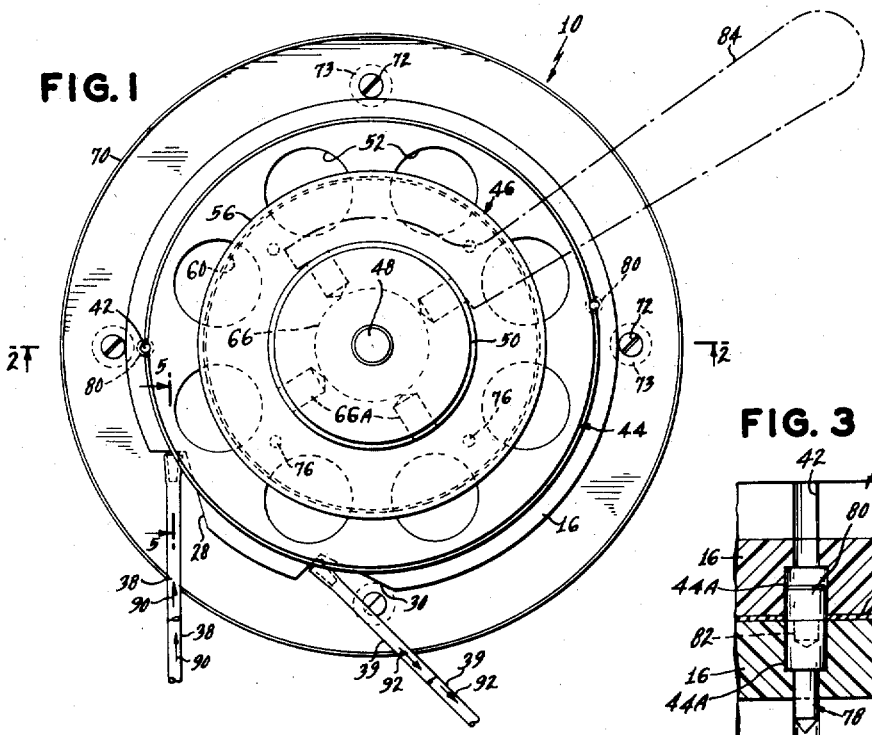
Fig. 1 is a plan view of a dialyzer apparatus pursuant to the present invention.
Figure 3:
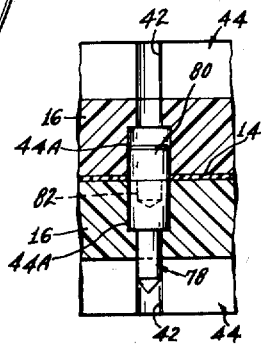
Fig. 3 is a fragmentary sectional view, on an enlarged scale, taken on the line 3—3 of Fig. 2.

Referring to the drawings in detail, the reference numeral 10 indicates a dialyzer device or apparatus pursuant to the present invention. The dialyzer 10 comprises a dialyzer membrane 14 mounted between a pair of grooved plates or members 16 which are clamped together by a clamping arrangement 20.

The members 16 are similar in construction and, as here shown, each member 16 is constituted by a circular plate or disc formed of a suitable material, for example and not by way of limitation, the members are formed of lucite and are transparent. At its face 18, each member is provided with a continuous spiral groove 20 which is reflexed substantially centrally along the extent thereof, as at 22, so that the terminals 24 and 26 of the groove 20 are in juxtaposition and are adjacent the periphery of the plates 16. As here shown, the plates 16 are provided with the notched portions 28 and 30 in the periphery thereof. Each plate is bored, as at 32—32, from each notched portion thereof to the adjacent terminal of the groove 20. Each bore 32 is provided with an enlarged portion or seat 34 which extends from the adjacent notch so as to receive a nipple 36 therein which extends outwardly of the associated notch. The projecting portion of each nipple 36 is adapted to receive one end of a fluid conduit 38 or 39, as the case may be.

In view of the foregoing, it will be apparent that each dialyzer plate or member 16 is provided with a pair of nipples 36 at the periphery thereof, one of the nipples constituting a fluid inlet and the other nipple constituting a fluid outlet, as hereinafter described in detail. Each plate 16 is provided also with a circular cutout 40 at the center thereof. In addition to the notches 28 and 30 provided at the periphery or circumference thereof, each plate 16 is provided at the peripheral or circumferential edge thereof with a stepped formation 40A, the function of which is hereinafter described. Each plate 16 is also provided, adjacent the periphery thereof with the eccentrically related bores 42—42 each of which has a seat defining portion 44A of larger diameter adjacent the grooved face 18 thereof.

The clamping means 20 is constituted by a pair of backing plates or pressure transmitting members 44—44 for the dialyzer members 16—16, respectively, a pair of clamping members 46—46 which act upon the backing plates, and the cooperating stud 48 and nut 50.

Figure 2:
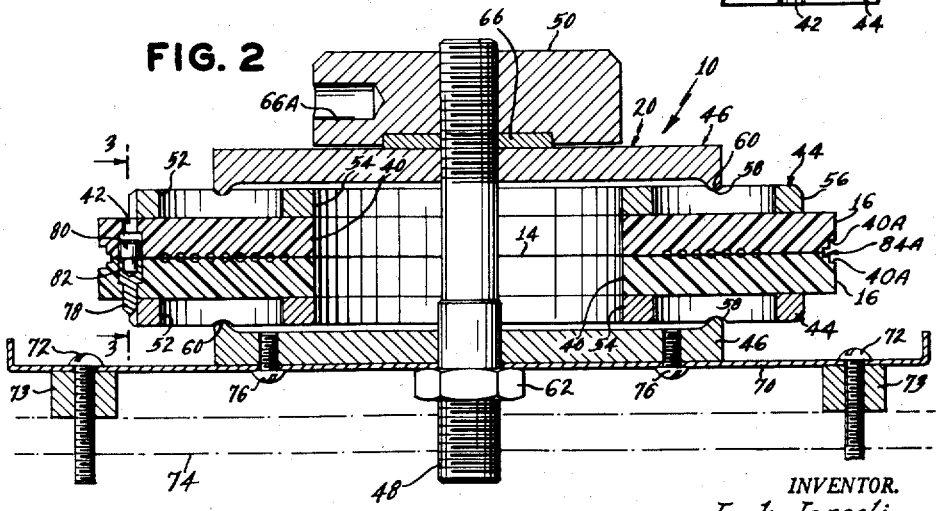
Fig. 2 is a sectional view, on an enlarged scale, taken on the line 2—2 of Fig. 1.

The backing plates 44, as here shown, are circular members which are preferably formed of a suitable metal, for example and not by way of limitation, stainless steel. Said plates are relatively thin and are provided with a plurality of equally spaced holes 52 arranged between a circular central opening 54 and the marginal or circumferential edge 56 thereof. Said holes 52, as best seen in Fig. 2, overlie the grooved portions of the dialyzer members as to make the grooves therein visible through the backing plates and, in addition, the holes provide a desired degree of flexibility to the backing members 44. In the outer surface thereof, each clamping member is provided with a circular groove 58.

The clamping members 46 are circular members formed of a suitable material, preferably stainless steel, and each is provided at the marginal edge thereof with a *lateral circular projection or rib* [circular rim] 60 which is adapted to engage in the circular groove 58 defined in the associated backing member 44.

The clamping mechanism 20 includes a check nut 62 which is provided on the stud 48 to form a shoulder for the clamping action, as hereinafter described, the nut 50 being operable to adjust the pressure provided by the clamping apparatus 20. A washer 66 is seated in the nut 50 so as to be interposed between the nut and the adjacent clamping element 46. The nut 50 is provided with four equally spaced holes 66A in the periphery thereof for adjusting the latter on the stud 48, as hereinafter described.

The dialyzer 10 is also provided with a spill plate 70 which, as here shown, is suitably secured, as by the bolts 72—72, to a suitable support 74, spacers 73 being interposed between the support and the spill plate.

When the dialyzer unit 10 is assembled for operation with the spill plate 70, suitably supported, as illustrated, the lower clamping member 46 (viewing Fig. 2) is secured to the spill plate 70 by means of the bolts 76—76. The stud 48 extends through the spill plate 70, the lower clamping member 46, the lower backing member 44, the lower dialyzer plate 16, the membrane 14, the upper dialyzer plate 16, the upper backing member 44, the upper clamp member 46, and the nut 50. It will be noted that the spiral groove 20 in the lower plate is in registry with the spiral groove 20 in the upper plate 16 with the membrane 14 disposed therebetween. As here shown, the membrane 14 is a circular element or disc formed of a suitable dialyzing material, for example and not by way of limitation, uncoated cellophane, which is clamped in position between the confronting faces of the plates 16 in which the grooves 20 are defined. In order to assure the absolute registry of the grooves in the upper and lower dialyzer plates 16, a socket pin 78 is inserted in the bore 42 of the lower plate 16, said socket pin being seated in the seat 44A defined therein and extending to the surface 18 of said plate, and a complementary pin 80 is inserted into the socket 82 of the socket pin 78. It will be understood that the socket pins 78 are inserted in each of the bores 42 of the lower plate 16, and the pins 80 are nested in the socket pins 78, prior to the assembly of the unit 10. Consequently, with the pins so carried in the bores 42 of the lower plate 16, registry is automatically effected when the upper plate 16 is superimposed over the lower plate so that the nested pins 80 extend into the bores 42 in the upper plate 16, being seated in the enlarged seats 44A defined in the surface 18 of the upper plate. In this connection, it will be understood that before the plates 16 are mounted in superimposed relation, as described, the diaphragm 14 is inserted therebetween so that when the plates are assembled, as illustrated in Fig. 2, the pins 78 and 80 extending between the two plates in the aligned bores 42 of the two plates, the grooves 20 at the opposite sides of the diaphragm 14 are in automatic registry. The backing members 44 are then disposed in abutment with the outer surfaces of the dialyzer plates 16, as illustrated, and the clamps 46 are disposed so that the rims 60 thereof engage in the grooves 58 formed in the outer surfaces of members 44. The entire unit is mounted over the spill plate 70 with the stud 48 extending therethrough, as illustrated. In this connection, it will be noted that the check nut 62 serves as a shoulder in abutment with the lower surface of the spill plate 70 so that the threaded adjustment of the nut 50 on the stud 48 serves to apply clamping pressure between the nuts 50 and 62 through the clamps 46 to the pressure transmitting members 44 and through the latter to the dialyzer plates 16. The nut 50 may be conveniently adjusted to supply the desired degree of clamping pressure by a suitable spanner wrench 84 which is adapted to engage in the openings 68 provided in the nut 50, as illustrated in phantom in Fig. 1.

It will be noted that the clamping pressure is applied by the clamps 46 to the flexible members 44 along the line of contact therebetween and more specifically at the line where each rim 60 is engaged in the complementary groove 58. It will be noted that this line of contact overlies the area of the plates 16 in which the grooves 20 are defined so that the clamping pressure is provided in the needed area, namely the area in which the membrane 14 is interposed between the grooves 20 so as to define fluid passages at the opposite sides of the membrane. The clamping pressure is applied evenly to the dialyzer plates 16 due to the previously described flexibility provided in the members 44 resulting from the apertured construction thereof in which much of the material is removed therefrom by the holes 52. The clamping pressure evenly applied to the plates 16 along a circle at each plate over the area thereof in which the groove 20 is defined, prevents any tilting or separation of the plates resulting from the application of the clamping pressure so that the membrane remains in fluid tight relation between the plates.

The previously described stepped formations 40A provided in the marginal edges of the dialyzer members 16 define a continuous peripheral notch 84A in the dialyzer unit 10. The notch 84A is adapted for the ready reception of a screw driver, or similar tool, which can be used to separate the dialyzer members 16, when the unit is disassembled, if said members should stick together due to the clamping pressure applied thereto.

Figure 5:
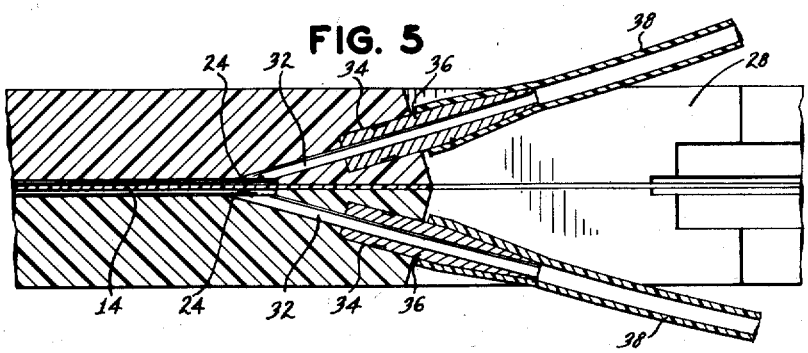
Fig. 5 is a fragmentary sectional view, on a greatly enlarged scale, taken on the line 5—5 of Fig. 1.
Figure 6:
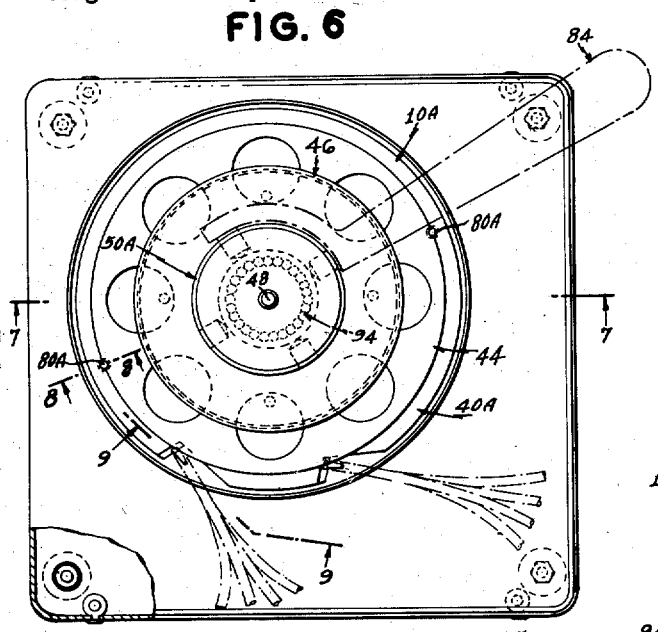
Fig. 6 is a view similar to Fig. 1 showing the presently preferred form of the invention.

The previously described registry of the grooves 20 by the nested pins 80 and 78 also effects the registry of the inlets and outlets of each of the plates 16. More specifically, it will be noted that the two nipples 36 which extend into the aligned notches 28 of the plates 16 are in alignment, as are the two nipples 36 which extend into the aligned notches 30 of the plates as best illustrated in Fig. 5. Consequently, the conduits 38 which are secured to each pair of aligned nipples are also in alignment. For example, as best illustrated in Fig. 1, the conduits 38 at the inlet nipples of the upper and lower plates 16 are aligned for fluid flow into the dialyzer through the inlet terminals 32 of the grooves 20, as indicated by the arrows 90—90 in Fig. 1. Similarly, the output nipples are aligned, and the associated conduits 39 thereof are in alignment for the flow of the fluids from the output terminals of the grooves 20, out of the dialyzer, as indicated by the arrows 92—92. Consequently, it will be noted that the inlet and outlet of each plate 16 is readily accessible at the same marginal edge portion of each plate along the outer edge thereof, this resulting from the reversal of fluid through each groove 20 due to the reflexed portion thereof. Said reflexed spiral groove arrangement results in a greatly increased number of convolutions per area unit of each plate 16.

The alignment of the inlets and outlets of the dialyzer plates 16 is advantageous in permitting a comparison to be made of the flows in each of the inlet conduits 38 and of the flows in each of the outlet conduits 39. However, it will be understood that insofar as other features of the present invention are concerned, the inlet and outlet of the upper plate need not be in alignment with the inlet and outlet of the lower plate.

In the presently preferred form of the invention illustrated by Figs. 6–9, the dialyzer apparatus comprises a plurality of dialyzer sections 10A disposed in superposed stacked relation, whereby the operative capacity of the dialyzer can be increased without increasing the diameter of the apparatus. In this connection, it may be observed that while only two dialyzer sections 10A are illustrated, the dialyzer apparatus may include three or more dialyzer sections. The plates are grooved preferably in the same way as described above to provide the fluid passages and each plate has a fluid inlet and an outlet. In Figs. 6 to 9, the parts which are the same as the parts provided in the form of the invention illustrated by Figs. 1 to 5 are designated by the same reference numerals. It will be understood that the dialyzer sections 10A are connected in series fluid-flow relation;

that is, the outlet 39 of the passage in the upper plate of the upper section 10A, is connected to the inlet 39A of the passage in the upper plate of the lower section 10A, and correspondingly, the outlet 41 of the lower passage in the upper section 10A is connected to the inlet 41A of the lower passage in the lower plate of the lower section 10A.

Figure 4:
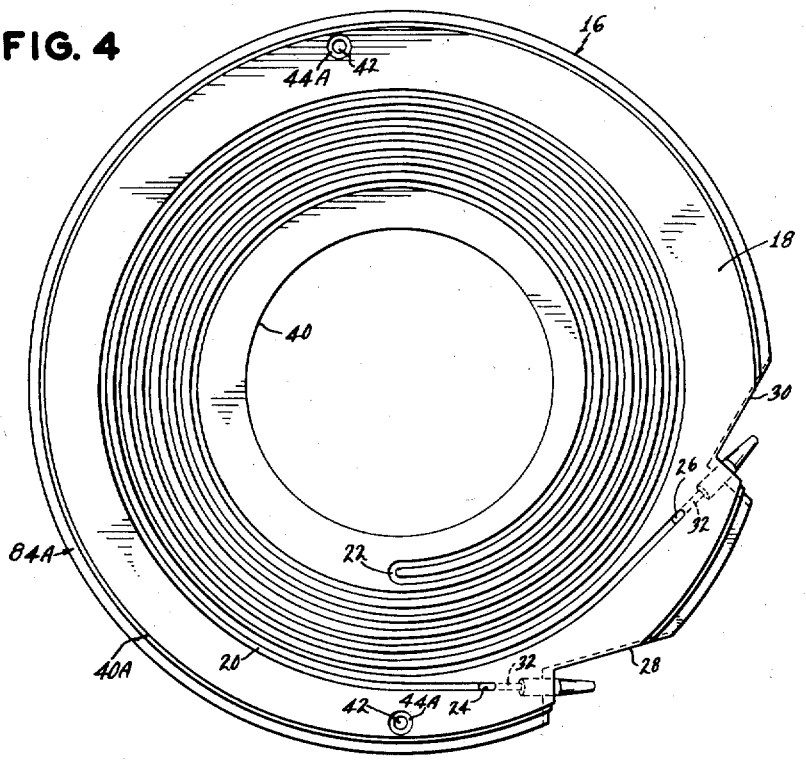
Fig. 4 is a plan view of one of the dialyzer members in which the grooves for the passage of fluid are defined, the face or surface thereof in which said grooves are defined being uppermost.

Also, pursuant to the preferred embodiment of the invention illustrated by Figs. 6 to 9, an improved clamping device is provided whereby to make it easier both to clamp and to unclamp the companion plates and the assembly. For this purpose the clamping nut 50A and the clamping member 66A which is in frictional engagement with the upper clamping plate 46 are provided with an interposed anti-friction or ball bearing device 94. This device is constituted by the circular grooves 95 and 96 in members 50A and 66A, respectively, forming a ball bearing race for the balls, as illustrated (Fig. 4). A split spring ring 98 holds member 66A in position in its assembly with member 50A, while allowing member 50A to be turned in screw-threaded engagement with stud 48 without turning the friction clamping member 66A. It will be understood that since member 50A does not engage clamping member 46 and has an antifriction engagement with clamping member 66A it is easier to turn said member 50A in performing the clamping and unclamping operations and considerable clamping pressure may be provided with comparatively little effort.

Figure 8:
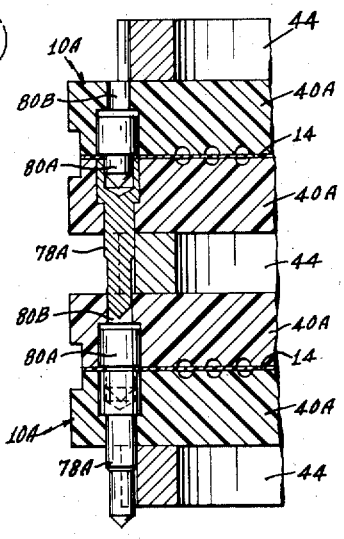
Fig. 8 is a fragmentary sectional view, on a large scale, on the line 8—8 of Fig. 6.
Figure 7:
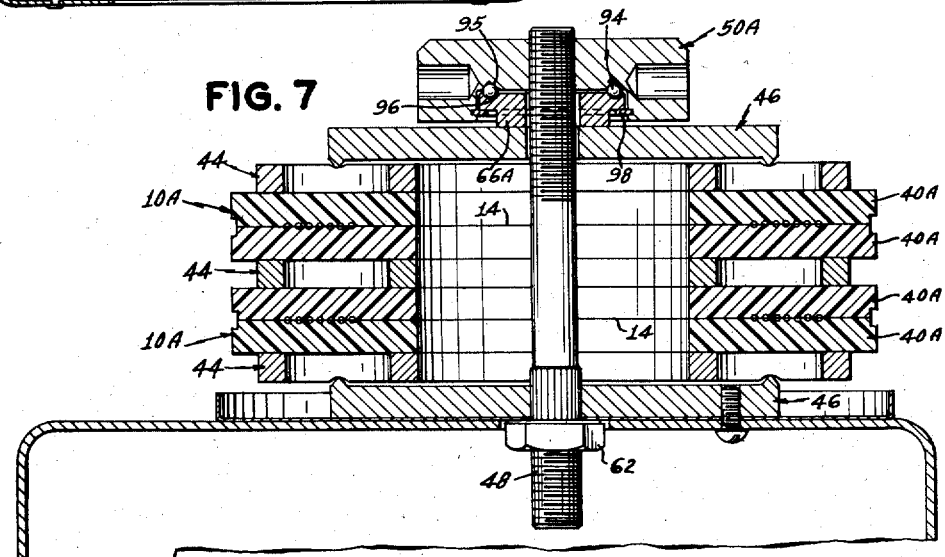
Fig. 7 is a vertical sectional view, on a larger scale, on the line 7—7 of Fig. 6.
Figure 9:
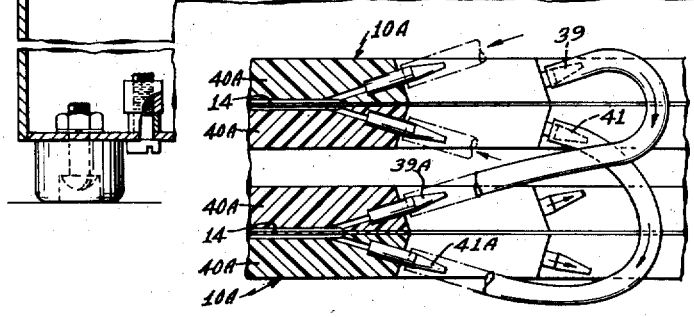
Fig. 9 is a fragmentary sectional view, on a large scale, on the line 9—9 of Fig. 6.

The grooves in the companion plates of each section are registered with each other by the pin and socket devices 78A, 80A, in the same way as the pin and socket devices 78, 80 described above, and in addition the pins 78A are long enough, as shown in Fig. 8, to engage in registering openings 80B in the adjacent plate of an adjacent section.

This application is a continuation-in-part of my United States application Serial No. 620,065, filed November 2, 1956, *now abandoned.*

While I have shown and described the preferred embodiments of my invention, it will be understood that various changes may be made *therein without departing from the underlying* [in] idea or principles of the invention within the scope of the appended claims.

Having thus described my invention, what I claim and desire to secure by Letters Patent is:

1. A dialyzer comprising a plurality of sections disposed in adjacent confronting relation, each of said sections comprising a pair of plate members mounted in confronting face-to-face relation, a dialyzer membrance interposed in fluid tight relation between the confronting faces of said members, said confronting face of each member having a continuous spiral groove defined therein, said groove being reflexed substantially midway along the extent thereof and the opposite ends thereof terminating substantially at the outer marginal edge of the associated plate and having a fluid inlet and a fluid outlet adjacent said inlet, respectively, said grooves constituting fluid passages, the outlets of the passages of one of said sections being connected to the inlets of the passages of another section at the similar sides, respectively, of the membranes of said sections, respectively.

2. A dialyzer, comprising a plurality of sections disposed in adjacent confronting relation, each section comprising a pair of plates and an interposed membrane, said plates having fluid passages, disposed at opposite sides, respectively, of the companion membrane, and fluid inlets and outlets for said passages, the outlets of the passages of one of said sections being connected to the inlets of the passages of another section at the similar sides, respectively, of the membranes of said sections, respectively, annular backing members disposed in clamping relation between the adjacent plates of adjacent sections, annular backing members in clamping relation with the other plates of said sections, respectively, said last mentioned backing members each having a circular groove and means for clamping said last mentioned backing members against said other plates, respectively, said clamping means each having a circular lateral projection complementary to and in abutting relation with the circular groove on the associated backing member, and thereby releasably clamping the companion plates together at opposite sides of the companion membrane and also releasably clamping said sections together in said unitary relation whereby to apply even pressure to said plates and provide a fluid tight joint between the plates of each section and the membrane therebetween.

3. A dialyzer, comprising a plurality of sections disposed in adjacent confronting relation, each section comprising a pair of plates and an interposed membrane, each confronting face of said plates having a continuous groove defined therein forming fluid passages disposed at opposite sides, respectively, of the companion membrane, each of said grooves being a spiral groove which is reflexed substantially midway along the extent thereof, and fluid inlets and outlets for said passages, the outlets of the passages of one of said sections being connected to the inlets of the passages of another section at the similar sides, respectively, of the membranes of said sections, respectively, annular apertured backing members disposed in clamping relation between the adjacent plates of adjacent sections, annular apertured backing members in clamping relation with the other plates of said sections, respectively, and means for exerting pressure along a circular line of contact to said last mentioned backing members to clamp the latter against said other plates, respectively, and thereby releasably clamping the companion plates together at opposite sides of the companion membrane and also releasably clamping said sections together in said unitary relation, said last mentioned means comprising a stud extending axially through said assembly and means adjustably movable in relation to said stud for exerting pressure on said backing members in the direction of the axis of said stud, said adjustably movable means being mounted on a roller bearing for rotation relative said stud.

4. A dialyzer, comprising a plurality of sections disposed in adjacent confronting relation, each section comprising a pair of plates and an interposed membrane, each of said plates having a continuous fluid flow groove free of obstructions disposed at opposite sides respectively, of the companion membrane, fluid inlets and outlets for said grooves, the outlets of the grooves of one of said sections being connected to the inlets of the grooves of another section at the similar sides, respectively, of the membranes of said sections, respectively, and means for clamping the membrane in each section in fluid tight relation between the associated plates and for clamping said sections together in said confronting relation, said clamping means including backing members disposed in clamping relation between adjacent plates of adjacent sections, a pair of backing members each having one surface thereof disposed in abutment with the outer plate of the outer sections, respectively, and a clamping member disposed at the other surface of each of said pair of backing members and operable thereon to exert the clamping pressure thereto along a circular line of contact.

5. A dialyzer, comprising a plurality of sections disposed in adjacent confronting relation, each section comprising a pair of plates and an interposed membrane, each of said plates having a continuous fluid flow groove free of obstructions disposed at opposite sides respectively, of the companion membrane, fluid inlets and outlets for said grooves, the outlets of the grooves of one of said sections being connected to the inlets of the grooves of another section at the similar sides, respectively, of the membranes of said sections, respectively, and means for clamping the membrane in each section, in fluid tight relation between the associated plates and for clamping said sections together in said confronting relation, said clamping means including backing members disposed in clamping relation between adjacent plates of adjacent sections, a pair of backing members each having one surface thereof disposed in abutment with the outer plate of the outer sections, respectively, and a clamping member disposed at the other surface of each of said pair of backing members and provided with a lateral circular projection which abuts the latter in registry with the fluid flow grooves, and means to urge said clamping members together against said pair of backing members along a circular line of contact for the application of even pressure to said plates within the area of said grooves to provide a fluid tight joint between the plates of each section and the membrane therebetween at said flow grooves.

6. A dialyzer, comprising a plurality of sections disposed in adjacent confronting relation, each section comprising a pair of plates and an interposed membrane, each confronting face of said plate having a continuous groove defined therein forming fluid passages disposed at opposite sides, respectively, of the companion membrane, each of said grooves being a spiral groove which is reflexed substantially midway along the extent thereof, and fluid inlet and outlets for said passages, the outlets of the passages of one of said sections being connected to the inlets of the passages of another section at the similar sides, respectively, of the membranes of said sections, respectively, annular apertured backing members disposed in clamping relation between the adjacent plates of adjacent sections, annular apertured backing members in clamping relation with the other plates of said sections, respectively, and means for exerting pressure along a circular line of contact to said last mentioned backing members to clamp the latter against said other plates, respectively, and thereby releasably clamping the companion plates together at opposite sides of the companion membrane and also releasably clamping said sections together in said unitary relation, said plates being transparent whereby said grooves are visible through the apertures in said backing members.

*7. A dialyzer comprising a pair of plate members mounted in confronting face-to-face relation, a dialyzer membrane interposed in fluid tight relation between the confronting faces of said members, each of said members having a continuous groove free of obstructions defined therein for providing for the flow of fluid along the adjacent surface of said membrane, the groove in the plate at one side of said membrane being in registry with the groove of the other plate at the opposite side of the membrane, each of said grooves having an inlet and an outlet, and both the inlet and the outlet of each plate being located at the outer marginal edge thereof and in adjacent relation to each other.*

*8. A dialyzer comprising a pair of plate members mounted in confronting face-to-face relation, a dialyzer membrane interposed in fluid tight relation between the confronting faces of said members, said confronting face of each member having a continuous groove defined therein, the groove in the plate at one side of said membrane being in registry with the groove of the other plate at the opposite side of the membrane, said groove being a spiral groove which is reflexed substantially midway along the extent thereof and having the opposite ends thereof terminating substantially at the outer marginal edge of the associated plate and having a fluid inlet and a fluid outlet, respectively.*

*9. A dialyzer comprising a pair of plate members mounted in confronting face-to-face relation, a dialyzer membrane interposed in fluid tight relation between the confronting faces of said members, each of said members having means providing for the flow of fluid along the adjacent surface of said membrane, each of said fluid flow means having an inlet and an outlet, and both the inlet and the outlet of each plate being located at the outer marginal edge thereof, and means to apply an even clamping pressure to said plates to clamp said membrane in fluid tight relation therebetween, said clamping pressure means including a pressure transmitting member operable on each plate to apply the clamping pressure evenly thereto, and a clamping plate having a circular projection operable on each pressure transmitting member to exert the clamping pressure thereto along a circular line of contact.*

*10. A dialyzer comprising a dialyzer membrane mounted between a pair of plate, the confronting surfaces of said plates each having a fluid flow groove defined therein for fluid flow along the adjacent surface of said membrane, a pair of backing members each having one surface thereof in abutment with the other surface of one of said plates, a clamping member disposed at the other surface of each backing member and provided with a lateral circular projection which abuts said other surface of the associated backing member in registry with the fluid flow groove of the associated plate, and means to urge said clamping members together against said backing members along a circular line of contact for the application of an even clamping pressure to said plates within the area of said grooves to provide a fluid tight joint between the dialyzer plates and the membrane at said flow grooves.*

*11. A dialyzer comprising a dialyzer membrane mounted between a pair of plates, the confronting surfaces of said plates each having a fluid flow groove defined therein for fluid flow along the adjacent surface of said membrane, a pair of relatively thin apertured backing members each having one surface thereof in abutment with the other surface of one of said plates, the other surface of each of said backing members having a circular groove, a clamping member disposed at said other surface of each backing member and provided with a lateral circular projection complementary to and abutting said groove at said other surface of the associated backing member along a circular line of contact in registry with the fluid flow groove of the associated plate, and means to urge said clamping members together against said backing members along said circular line of contact for the application of an even clamping pressure to said plates within the area of said flow grooves to provide a fluid tight joint between the dialyzer plates and the membrane at said flow grooves.*

*12. A dialyzer comprising a pair of plate members mounted in confronting face-to-face relation, a dialyzer membrane interposed in fluid tight relation between the confronting faces of said members, each of said members having means providing for the flow of fluid along the adjacent surface of said membrane, each of said fluid flow means having an inlet and an outlet, and both the inlet and the outlet of each plate being located at the outer marginal edge thereof, and means to apply an even clamping pressure to said plates to clamp said membrane in fluid tight relation therebetween, said clamping pressure means including a pressure transmitting member operable on each plate to apply the clamping pressure evenly thereto, and a clamping plate having a circular rib operable on each pressure transmitting member to exert the clamping pressure thereto along a circular line of contact, said pressure transmitting members being apertured and said plate members being transparent whereby said flow means are visible through the apertures of said pressure transmitting members, respectively.*

*13. A dialyzer comprising a dialyzer membrane mounted between a pair of plates, the confronting surfaces of said plates each having a fluid flow groove defined therein for fluid flow along the adjacent surface of said membrane, a pair of backing members each having one surface thereof in abutment with the other surface of one of said plates, a clamping member disposed at the other surface of each backing member and provided with a lateral circular projection which abuts said other surface of the associated backing member in registry with the fluid flow groove of the associated plate, and means*

*to urge said clamping members together against said backing members along a circular line of contact for the application of an even clamping pressure to said plates within the area of said grooves to provide a fluid tight joint between the dialyzer plates and the membrane at said flow grooves, said urging means comprising a stud extending through said clamping members, said backing members, said plates and said membrane, a shoulder defining part provided outwardly of one of said clamping members and an adjustable nut provided outwardly of the other of said clamping members.*

*14. A dialyzer comprising a pair of plate members mounted in confronting face-to-face relation, a dialyzer membrane interprosed in fluid tight relation between the confronting faces of said members, said confronting face of each member having a continuous groove defined therein, said groove being a spiral groove which is reflexed substantially midway along the extent thereof and having the opposite ends thereof terminating substantially at the outer marginal edge of the associated plate and having a fluid inlet and a fluid outlet, respectively, a pair of relatively thin apertured backing members each having one surface thereof in abutment with the other surface of one of said plates, the other surface of each of said backing members having a circular groove, a clamping member disposed at said other surface, of each backing member and provided with a lateral circular projection complementary to and abutting said groove at said other surface of the associated backing member along a circular line of contact in registry with the fluid flow groove of the associated plate, and means to urge said clamping members together against said backing members along said circular line of contact for the application of an even clamping pressure to said plates within the area of said flow grooves to provide a fluid tight joint between the dialyzer plates and the membrane at said flow grooves.*

References Cited in the file of this patent
or the original patent

UNITED STATES PATENTS

| | | |
|---|---|---|
| 1,928,182 | Mahoney | Sept. 26, 1933 |
| 2,076,049 | Seitz | Apr. 6, 1937 |
| 2,252,213 | Skolnik | Aug. 12, 1941 |
| 2,389,814 | Pond et al. | Nov. 27, 1945 |
| 2,708,658 | Rosenberg | May 17, 1955 |